US008065340B2

(12) United States Patent　(10) Patent No.: US 8,065,340 B2
　　Petri　(45) Date of Patent: Nov. 22, 2011

(54) METHOD AND SYSTEM FOR HIGHLY TOLERANT AND ADAPTABLE CONTENT REUSE IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 11/855,731

(22) Filed: Sep. 14, 2007

(65) Prior Publication Data

US 2009/0077111 A1　Mar. 19, 2009

(51) Int. Cl.
　　*G06F 17/30*　(2006.01)
(52) U.S. Cl. .......................... 707/803; 707/693; 715/236
(58) Field of Classification Search .................. 707/100, 707/101, 102, E17.116, 791, 796, 802, 803, 707/693, 809; 715/234, 255, 205, 200, 202, 715/235, 236, 731, 231
　　See application file for complete search history.

(56) References Cited

U.S. PATENT DOCUMENTS

| 7,496,837 | B1* | 2/2009 | Larcheveque et al. ........ | 715/237 |
|---|---|---|---|---|
| 2002/0133516 | A1* | 9/2002 | Davis et al. .................... | 707/513 |
| 2002/0156803 | A1* | 10/2002 | Maslov et al. ................. | 707/500 |
| 2005/0091581 | A1* | 4/2005 | Bezrukov et al. ............. | 715/513 |
| 2005/0149862 | A1* | 7/2005 | Weitzman et al. ............. | 715/522 |
| 2006/0155725 | A1* | 7/2006 | Foster et al. ................... | 707/100 |
| 2007/0028162 | A1* | 2/2007 | Griffin et al. ................. | 715/513 |
| 2007/0067371 | A1* | 3/2007 | Allan et al. ................... | 707/206 |

OTHER PUBLICATIONS

John E. Petri, U.S. Appl. No. 11/675,239, Method for Multicontent XML Fragment Reuse and Validation in a Content Management System, filed Feb. 15, 2007.
Ronald Bourret, "XML Database Products: Content (Document) Management Systems", printed from http://www.rpbourret.com/xml/ProdsCMS.htm on Sep. 13, 2007.
Rizwan Virk, "The Seven Deadly Sins of XML Publishing", printed from http://www.cabridgedocs.com/resources/whitepapers/sevendeadlysins.htm on Sep. 13, 2007.
"Darwin Information Typing Architecture", pp. 1-3, printed from http://en.wikipedia.org/wiki/DITA on Sep. 13, 2007.
Paul Prescod, "DITA, Content Management and XML Authoring", XML 2005 Conference proceeding by RenderX, pp. 1-13.
"Microformat", pp. 1-5, printed from http://en.wikipedia.org/wiki/Microformats on Sep. 13, 2007.
"Jim's Thoughtspot", pp. 1-10, printed from http://jims-thoughtspot.blogspot.com on Sep. 13, 2007.
Ann Rockley, et al., "Single Sourcing: Benefits to the Life Sciences", STC's 50th Annual Conference Proceedings, pp. 373-377, Oct. 2002.

(Continued)

*Primary Examiner* — Greta Robinson
(74) *Attorney, Agent, or Firm* — Patterson & Sheridan, LLP

(57) ABSTRACT

Embodiments of the invention generally provide for highly tolerant and adaptable content reuse in a content management system (CMS). The method and system allow an author to reuse fragments of content that are composed from a document structure incompatible with a document structure of a document which the fragment is being incorporated. In such a case, the CMS may be configured to generate a new branched fragment, based on the content of the original fragment, but composed according to the grammar of the document which the fragment is being incorporated. Additionally, the CMS may be configured to maintain a relationship between an original fragment and branched fragments derived therefrom. Further, any content changes made to the original fragment may be incorporated by any associated branch fragments.

15 Claims, 7 Drawing Sheets

OTHER PUBLICATIONS

Darwin Information Typing Architecture (DITA) Specification 1.0, pp. 1-50, Feb. 2005.

"Arbortext Dynamic Link Manager", pp. 1-2, printed from http://www.ptc.com/appserver/mkt/products/home.jsp?k=3596, printed Sep. 13, 2007.

Agarwala, et al. "Morphable Messaging: Efficient Support for Evolution in Distributed Applications", College of Computing Georgia Institute of Technology, 2nd International Workshop on Challenges of Large Applications in Distributed Environments (CLADE 2004), Jun. 7, 2004.

Ho-Pong, et al, "On the Use of Hierarchical Information in Sequential Mining-Based XML Document Similarity Computation", http://www.springerlink.com/content/5mufgj9mqq4496cf/?print=true, May 2005.

* cited by examiner

METHOD AND SYSTEM FOR HIGHLY TOLERANT AND ADAPTABLE CONTENT REUSE IN A CONTENT MANAGEMENT SYSTEM

BACKGROUND OF THE INVENTION

1. Field of the Invention

Embodiments of the invention are generally related to managing a collection of data objects in a content management system. More specifically, embodiments of the invention are related to a method and system for managing content to ensure highly tolerant and adaptable content reuse.

2. Description of the Related Art

Content management systems (CMS) allow multiple users to share information. Generally, a CMS allows users to create, modify, archive, search, and remove data objects from an organized repository. The data objects managed by a CMS may include documents, spreadsheets, database records, digital images, and digital video sequences, to name but a few. A CMS typically includes tools for document publishing, format management, revision and/or access control, along with tools for document indexing, searching, and retrieval.

An XML-aware CMS, such as IBM Solution for Compliance in a Regulated Environment (SCORE), may provide the users with a variety of advantages, for example:

structured authoring—the ability to incorporate metadata that is normally lost in conventional formats repurposing of data—the ability to share fragments of data or to transform the data into different formats publishing—the ability to have "single source publishing" using XML stylesheets (e.g. XSLT) that separate content from presentation interoperability—the ability to utilize XML data across different systems or applications intelligent storage—the ability to synchronize XML content with attributes in the CMS Because of these, and other advantages, XML is growing in popularity as the preferred format for authoring and publishing (e.g. for Web page authoring/publishing).

To provide some of these advantages, a CMS may be configured to break apart or disassemble an XML document into smaller "chunks." This process is typically referred to as bursting, and each chunk can be managed as its own object in the CMS. The XML document may be referred to as a "parent" or "master" document and each chunk may be referred to as a fragment. When the user checks-out an XML document that has been burst, the CMS assembles the various fragments so that the XML document appears to the user as a single unit. In addition to bursting, there are numerous other techniques, equally known in the art, for creating XML fragments.

Fragments may be stored independently from a parent document in the CMS. As such, multiple documents may reuse any given fragment. By storing commonly used XML fragments, the common information may be written once and referenced by multiple parent documents.

SUMMARY OF THE INVENTION

One embodiment of the invention includes a method for reusing content in multiple documents managed by a content management system (CMS). The method generally includes receiving a selection of a first document fragment composed according to a first document structure, where the first document fragment is to be included in a parent document composed according to a second document structure, where the first document structure comprises a first XML schema and the second document structure comprises a second XML schema, and where the first XML schema includes a set of markup tags different from a set of markup tags included in the second XML schema. The method also includes generating a branched fragment that includes content from the first document fragment, where the branched fragment is composed according to the second document structure. Generating the branched fragment includes determining that the first document structure and the second document structure are structurally identical, and generating a mapping between one or more structural elements of the first document structure and corresponding elements of the second document structure, where the mapping between one or more structural elements of the first document structure and corresponding elements of the second document structure includes mapping each markup tag of the first XML schema included in the first document fragment to a corresponding markup tag of the second XML schema. The method also includes inserting the branched fragment in the parent document, generating a data structure indicating a relationship between the first document fragment and the branched fragment, and storing the data structure in the CMS.

Other embodiments of the invention include a computer-readable storage medium containing a program which, when executed, performs the above recited method, as well as a system having a processor and a memory storing a content management system (CMS) program, which, when executed on the processor, performs the above recited method.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
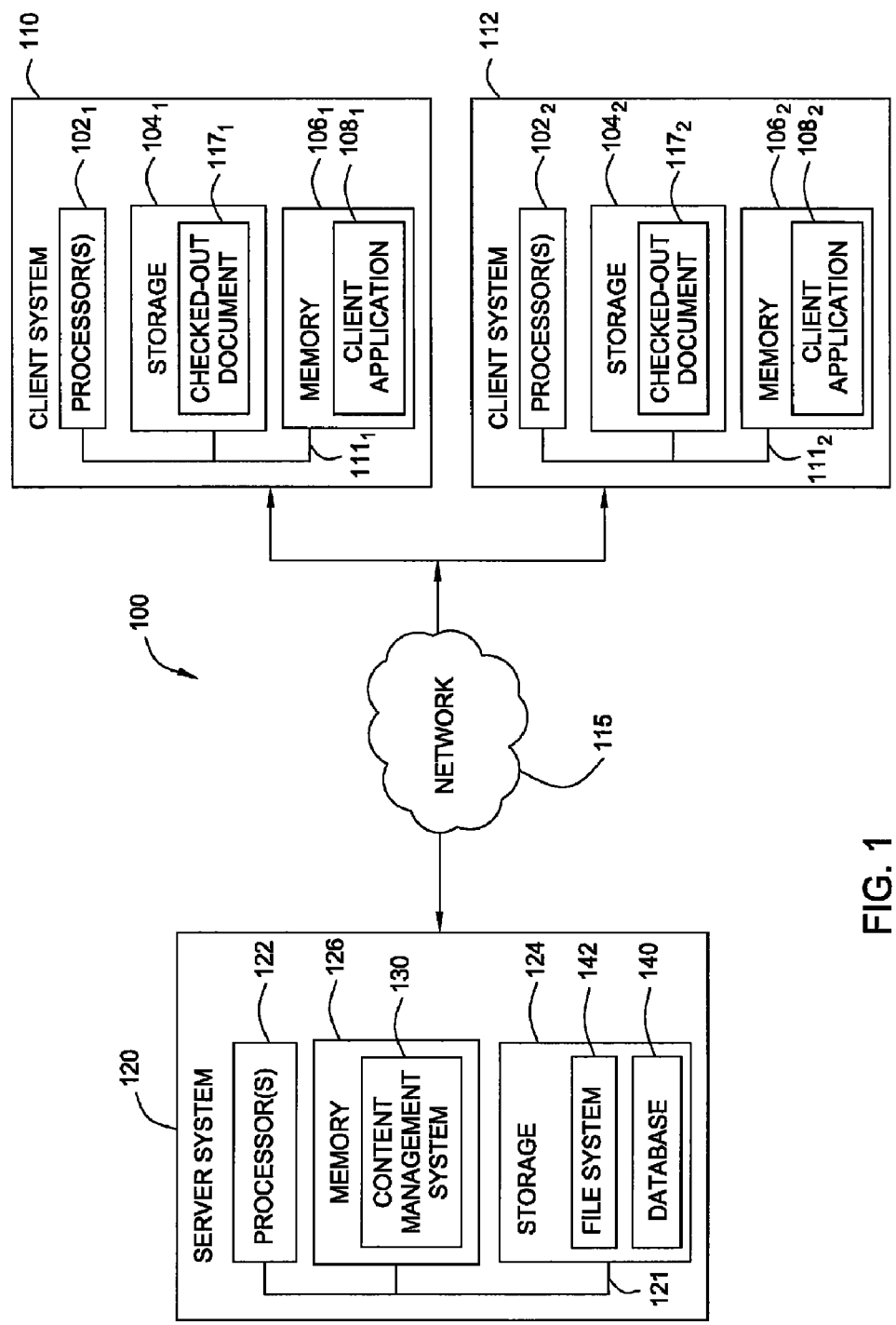
FIG. 1 is a block diagram illustrating a computing environment and content management system (CMS), according to one embodiment of the invention.

Despite the clear benefits of content reuse, the current state of the art provides only limited support for a content management system to reuse portions of document content (e.g., an XML fragment). This occurs primarily because of restrictions placed on inserting a fragment into a given document. Although a CMS may be configured to maintain the validity of a fragment across multiple parent documents, typically, an XML grammar (usually defined by a DTD or schema) is used to enforce a particular document structure. This requires a fragment to adhere to the same XML grammar of the parent in order to be used within a given parent document. Thus, in current art, this problem is solved by proactively restricting which XML fragments are available for reuse within a particular parent, and at which locations in the parent document the fragments may be inserted, based on the grammar of the parent document and of the fragment.

However, this approach significantly limits fragment reuse by narrowing an author's choices of shared content to include in an XML document. Frequently, an author may find content (e.g. via a full-text repository search) that is a good candidate for reuse, but the content may not be in the correct structure/grammar to be allowed within the current context (i.e. within the parent document). In other cases, if an author is searching the repository, then potential reuse candidates may be eliminated before the author even sees those fragments in the query results (e.g. the query engine may eliminate chunks that are not composed according to the same grammar as the parent).

Embodiments of the invention generally enable highly tolerant and adaptable content reuse in a content management system (CMS). The method and system allow an author to reuse fragments of content that may not be composed according to a grammar of the parent document. In one embodiment, an author may attempt to insert an XML fragment with an XML grammar that is isomorphic to the grammar of the parent. That is, the grammars are generally identical in structure, but not in form. In such a case, the CMS creates a new branched fragment, based on the original XML fragment's content, which adheres to the grammar of the parent document. In another embodiment, an author may attempt to insert a fragment composed from a grammar very dissimilar from the parent document's grammar. In such a case, the CMS may determine whether a defined transformation for the document type of the fragment is available that produces an output compatible with the grammar of the parent. Further, embodiments of the invention ensure that relationships and mappings are maintained between original fragments and their associated branches. Therefore, any content changes made to an original fragment are incorporate by any associated branch fragments.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Further, embodiments of the invention are described herein adapted for use with the widely used XML markup language. Accordingly, references to data objects, documents, and XML documents generally refers to data marked up using a well-formed collection of XML tags, elements and/or attributes. As is known, an XML document may be used to describe virtually any type of data. For example, XML grammars have been used to describe word processing documents, spreadsheets, database records, digital images and digital video, to name but a few. Further, specialized grammars are frequently specified by a domain specific XML schema (e.g., the eCTD specification published by the International Conference on Harmonisation of Technical Requirements (ICH)). A given XML document may also be associated with additional artifacts such as a document type definition (DTD), XSL style sheets, and other associated files, tools and utilities. However, the invention is not limited to the XML markup language, XML schemas, and the use of XML documents; rather, embodiments of the invention may be adapted to other markup languages or other data object formats or data representations, whether now known or later developed.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client/server view of a computing environment 100, according to one embodiment of the invention. As shown, computing environment 100 includes two client computer systems 110 and 112 communicating with a server system 120 over a network 115. The computer systems 110, 112, and 120 illustrated in environment 100 are included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Additionally, those skilled in the art will recognize that the illustration of computer systems 110, 112, and 120 are simplified to highlight aspects of the present invention and that computing systems and networks typically include a variety of additional elements not shown in FIG. 1.

As shown, client computer systems 110 and 112 each include a CPU $102_1$ and $102_2$, storage $104_1$ and $104_2$, and memory $106_1$ and $106_2$ connected by a bus $111_1$ and $111_2$, respectively. CPUs $102_1$ and $102_2$ are programmable logic devices that perform all the instructions, logic and mathematical processing performed in executing user applications (e.g., a client application $108_1$ or $108_2$). Storage $104_1$ and $104_2$ store application programs and data for use by client computer systems 110 and 112. Typical storage devices $104_1$ and $104_2$ include hard-disk drives, flash memory devices, optical media and the like. Additionally, the processing activity and access to hardware resources made by client application $108_1$ and $108_2$ may be coordinated by an operating system (not shown). Well-known examples of operating systems include the Windows® operating system, distributions of the Linux® operating system, among others. (Linux is a trademark of Linus Torvalds in the US, other countries, or both). Network 115 represents any kind of data communications network, including both wired and wireless networks. Accordingly, network 115 is representative of both local and wide area networks, including the Internet.

Illustratively, memory $106_1$ and $106_2$ of client computer systems 110 and 112 includes a client application $108_1$ and $108_2$, respectively. In one embodiment, client applications $108_1$ and $108_2$ are software applications that allows end users to retrieve and edit data objects stored in a content management system (CMS) 130. Thus, client applications $108_1$ and $108_2$ may be configured to allow users to create, edit, and save a data object, e.g., word-processing documents, spreadsheets, database records, digital images or video data objects, to name but a few (collectively referred to as "documents"). In one embodiment, client applications $108_1$ and $108_2$ may be configured to receive a document $117_1$ and $117_2$ from CMS 130 and store it in storages $104_1$ and $104_2$ while it is being accessed by client application $108_1$ and $108_2$.

As stated, documents accessed from CMS 130 may be marked up with XML tags describing the substantive data within the document, relative to an associated XML schema. When a user attempts to incorporate an XML fragment into a parent document based on a particular grammar, CMS 130 may create a new branched fragment, based on the content of the original fragment, but with a grammar consistent with that of the parent document. This ensures that a user has a large pool of fragments to choose from when authoring an XML document, since a difference in grammar between a parent document and a particular fragment is a much less limiting factor when determining whether the parent may incorporate the fragment.

The CMS 130 may be further configured to maintain a relationship between an original fragment and all its corresponding branched fragments. As such, whenever content within an original fragment is updated, the CMS may automatically update all branched fragments that are related to that original fragment accordingly.

As shown, server system 120 includes a CPU 122, CMS storage repository 124, and a memory 126 connected by a bus 121. CMS repository 124 may include a database 140 and file system 142. File system 142 typically provides access to a directory structure contained on a disk drive or network file system and may be used to store files (e.g., documents managed by CMS 130). Database 140 may contain additional information and metadata related to documents stored in file system 142. Memory 126 of server system 120 includes CMS 130. As stated, CMS 130 may provide an application program configured for creating, modifying, archiving, and removing content managed by CMS 130. Thus, CMS 130 may include tools used for publishing, format management, revision and/or access control, content indexing, and facilities for performing searches and other operations related to documents managed by CMS 130.

Figure 2:
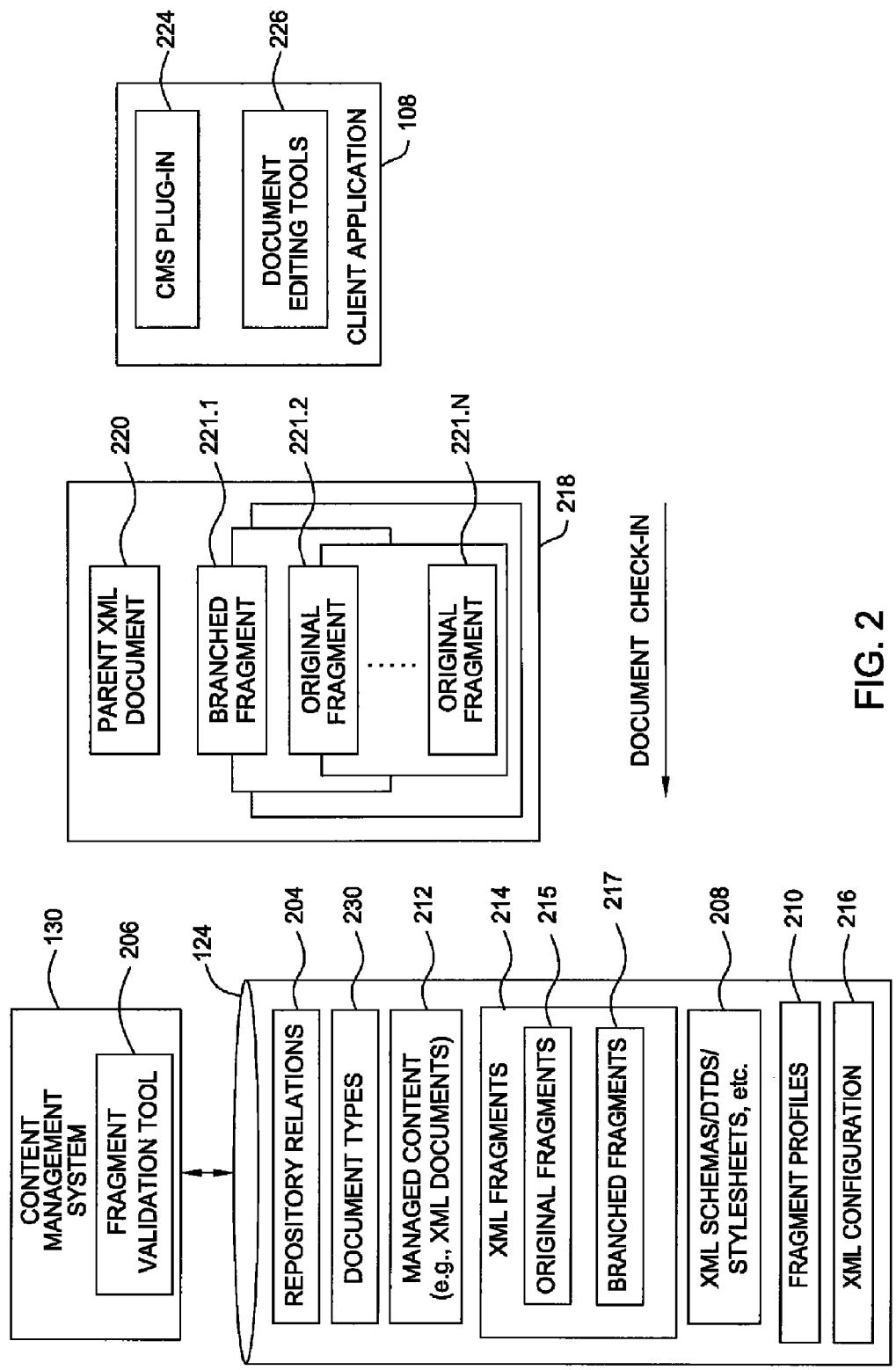
FIG. 2 is a conceptual illustration of a client application checking-in a document managed by a CMS, according to one embodiment of the invention.

FIG. 2 is a conceptual illustration of client application 108 checking-in an XML document 218 managed by CMS 130, according to one embodiment of the invention. As shown, CMS 130 includes a fragment validation tool 206. Those skilled in the art will recognize that the CMS 130 illustrated in FIG. 2 is simplified to highlight aspects of the present invention and that CMS systems typically include a variety of additional elements not shown in FIG. 2.

Generally, fragment validation tool 206 represents a component of CMS 130 configured to determine whether a fragment that a user has requested to insert within a given document is valid within the grammar of that document. In addition, fragment validation tool 206 may be configured to ensure that any updates to an original fragment remain valid across any branched fragments associated with the original fragment.

As shown, CMS repository 124 includes repository relations 204, document types 230, managed content 212, XML fragments 214, XML schemas 208, fragment profiles 210, and configuration sets 216. Also as shown, XML fragments 214 include both original fragments 215 and branched fragments 217. In one embodiment, original fragments 215 provide the unmodified content of a fragment burst from a parent document or created in other ways known in the art. In contrast, branched fragments 217 represent a copy of a given original fragment 215, modified for use within a particular parent document. In one embodiment, both original fragments 215 and branched fragments 217 may be reused in multiple documents (e.g., a document included in managed content 212). Further, a given original fragment 215 may be related to more than one of branched fragments 217 when inserted into multiple, distinct parent documents.

In one embodiment, repository relations 204 specify bindings between an original fragment and any associated branched fragments. When a user attempts to insert an original fragment with a particular grammar into some element of managed content 212 (e.g. an XML document) with a grammar different from that of the original fragment, CMS 130 may create a branched fragment based on the content of the original fragment, but with a grammar that matches the grammar of the managed content 212 into which the fragment is inserted. In cases where a particular original fragment has multiple branched fragments, repository relations 204 include separate relationships between the original fragment and each one of its branched fragments. Repository relations 204 allow CMS 130 to maintain a mapping between a given original fragment 215 and any corresponding branched fragments 217. Therefore, any updates to the original fragment are mapped to the associated branched fragments based upon an original fragment's repository relations 204. In addition, repository relations 204 specify the bindings between managed content 212 and the grammars used to interpret the document, such as those defined in XML schemas/DTDs 208. For example, repository relations 204 may specify a particular DTD to use when accessing a specific type of XML document, as defined in document types 230.

As is known, an XML schema/DTD defines the allowable content and structure for a given type of XML document. More specifically, XML schemas/DTDs 208 provide rules specifying which elements (e.g., the markup tags) and attributes (i.e., values associated with specific tags) are allowed for a particular type of XML document, as well as rules regarding other elements of document structure. For example, a parent XML document, as described above, may include references to a set of XML schemas/DTDs specifying the allowed structure and content for the parent and related child documents, such as an XML fragment 214. Each child document may be governed by its own grammar and schema. In addition to XML schemas/DTDs 208, an XML fragment 214 may reference other files such as stylesheets, transforms (e.g., transforms used to generate an HTML or XHTML document from a source XML document) etc.

Whenever CMS 130 creates a new branched fragment and establishes a relationship between the new branched fragment and the corresponding original fragment, CMS 130 may also add a fragment profile 210 to the original fragment 215. In one embodiment, fragment profile 210 may include metadata which indicates how CMS 130 should process an associated original fragment 215. For example, CMS 130 may use fragment profile 210 to identify which branched fragments 217 need to be updated when content is modified in a corresponding original fragment 217.

In one embodiment, a document author may attempt to reuse an original fragment 215 composed according to a grammar that is very dissimilar from a grammar of the document in which the users would like to reuse that fragment. In such a case, CMS 130 may be configured to determine whether a document type 230 associated with the original fragment 215 has an XML configuration set 216 associated with that original fragment 215. A configuration set 216 may include a collection of documents used to manage a document type 230 (e.g., DTDs, schemas, style sheets, XSLT transforms, etc.). If the original fragment 215 has an associated configuration set 216, CMS 130 may then determine whether that configuration set 216 contains any transformations that produce an output compatible with the grammar of the parent document in which a user would like to include the original fragment 215. In such a case, the CMS 130 may apply that transformation to the original fragment 215 to create a version of that original fragment 215 that may be used to create a branched fragment 217 for inclusion in the relevant parent document.

FIG. 2 also shows a document 218 being checked-in to CMS 130. In this example, document 218 includes a parent document 220 composed from multiple fragments, both original fragments (i.e., content that originated from documents of the same type as parent document 220 and branched fragments (i.e., content originated in other documents that are not the same type as document 220, but is reused in document 220). In one embodiment, when document 218 is checked-in, CMS 130 bursts document 220 into a parent XML document 220, and one or more XML fragments 221.1-221.N, one (or more) of which may have been modified after XML document 218 was checked out from CMS 130. For purposes of illustration, assume that original fragment 221.2 represents such a fragment. In such a case, CMS 130 may be configured to update any branched fragments 217 bound to original fragment 221.2 to reflect changes made to original fragment 221.2 The branched fragments may be identified using repository relations 204.

As shown, client application 108 includes a CMS plug-in 224 and document editing tools 226. CMS plug-in 224 allows client application 108 to interact with CMS 130. For example, plug-in 224 may allow a user interacting with client application 108 to check-in and check-out documents (e.g., XML document 218) from CMS 130. Document editing tools 226 provide the substantive features associated with a particular client application 108. For example, a word processing application may provide tools for specifying document presentation style and text-content or a web-browser may be used to render, view, and edit XML document 218. Another example of a client application 108 includes a web-browser. Of course, depending on the function of client application 108, the features provided by document editing tools 226 may be tailored to suit the needs of an individual case.

Fragment Insertion for Similar Document Grammars

Figure 3:
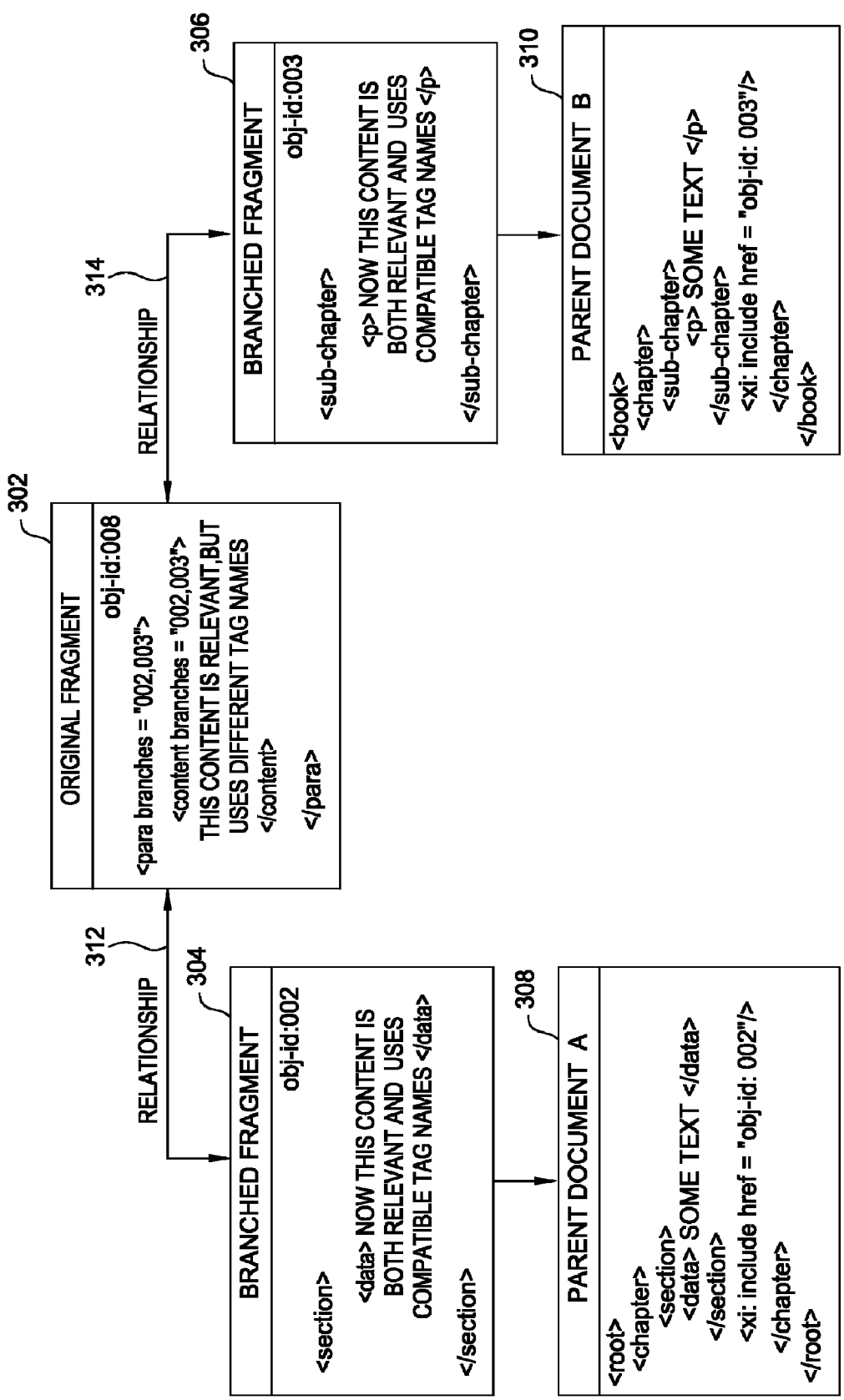
FIG. 3 illustrates two parent documents each incorporating a branched fragment generated from a single original fragment having a grammar similar to the two parent documents, according to one embodiment of the invention.

FIG. 3 illustrates two parent XML documents 308, 310, which each incorporate a branched fragment 304, 306 generated from a single original fragment 302, according to one embodiment of the invention. As described, a given document fragment may be related to multiple branched fragments. Specifically, FIG. 3 illustrates a scenario where original fragment 302 has relationships 312,314 to branched fragments 304, 306 respectively. In this example, there are two different parent documents, parent document "A" 308 and parent document "B" 310, and each parent document is composed according to a different grammar.

Parent document "A" 308 includes a markup element "<section>" and a sub-markup element "<data>," while parent document "B" 310 includes a markup element "<sub-chapter>" and a sub-element "<p>." In this case, clearly, this portion of the grammar of parent documents "A" and "B" 308, 310 are isomorphic to the structure of original fragment 302. That is, both grammars include a single element with a single sub-element. However, original fragment 302 is composed using a grammar that includes a "<para>" element and a "<content>" sub-element. Thus, parent documents "A" and "B" 308, 310 are unable to reuse original fragment 302 due to the differences in element names, despite the obvious similarity in structure.

In one embodiment, CMS 130 may be configured to address this scenario by creating branched fragments 304, 306, based on the content of original fragment 302, with grammars matching the grammars of parent documents "A" and "B" 308, 310 respectively. CMS 130 may create a copy of original fragment 302, but modify the markup tags to allow the original fragment to be reused as branched fragments 304, 306. In other words, the content and structure of the branched fragment remains the same as the original fragment, while the labels of markup tags are changed to match the grammar of the parent document. Illustratively, in this example, CMS 130 creates branched fragment 304 with <section>and <data>tags to match the grammar of parent document "A" 308, while maintaining the same content as the original fragment 302. Additionally, CMS 130 creates branched fragment 306 with the <sub-chapter> and <p> tags to match the grammar of parent document "B" 310, while maintaining the same content within the elements as the original fragment 302. Parent document "A" 308 may now reuse branched fragment 304. As shown, parent document "A" 308 references branched fragment 304 (with an ID of "obj_id:002") and not the original fragment 302 (with an ID of "obj_id:001"). The same is true of parent document "B" 310, which references the branched fragment 306 (with an ID of "obj_id:003").

FIG. 3 also illustrates the relationships 312, 314 established between original fragment 302 and branched fragments 304, 306 respectively. As a result, when content in original fragment 302 is updated, CMS 130 may also update the related branched fragments 304, 306.

Fragment Insertion for Dissimilar Document Grammars

Figure 4:
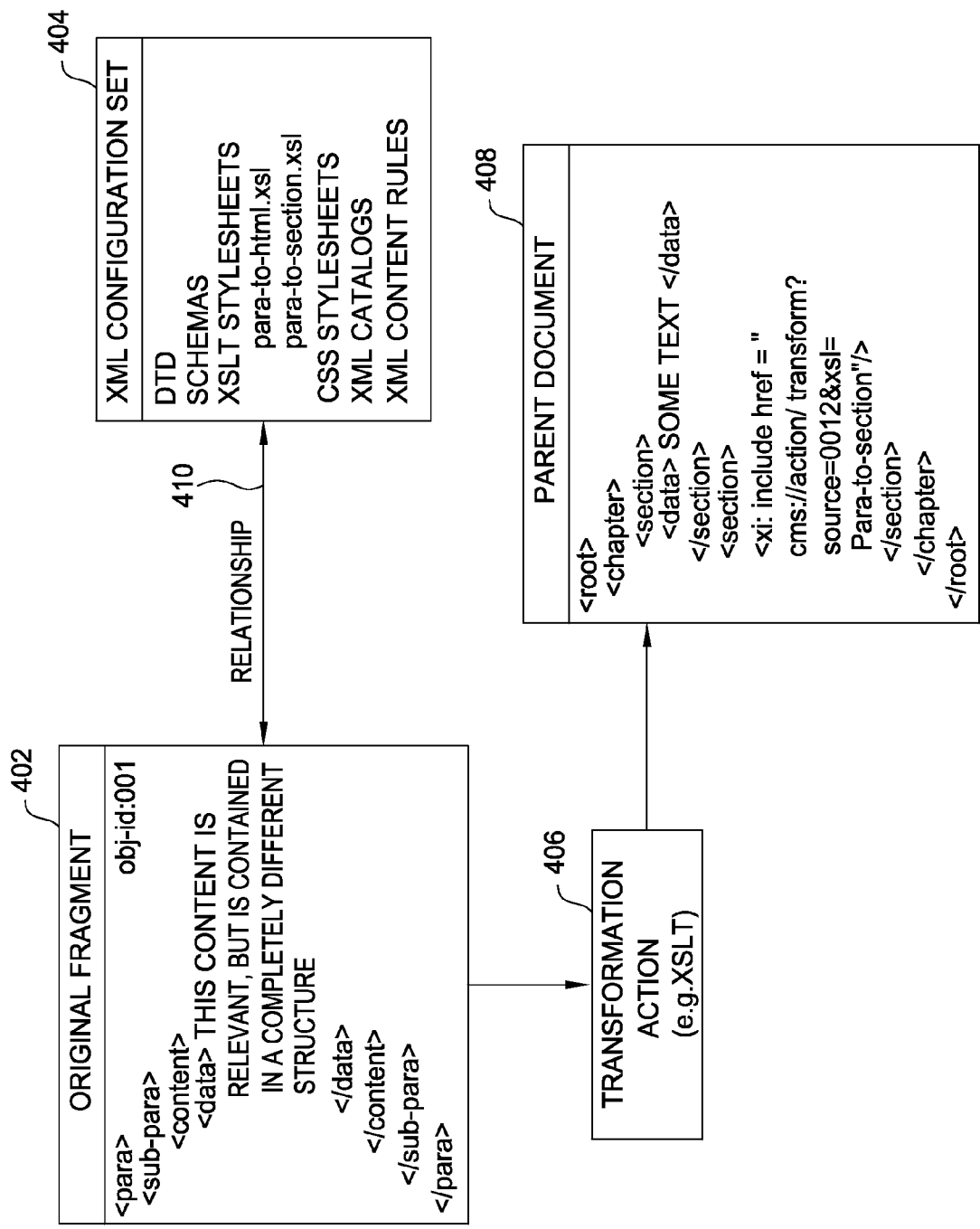
FIG. 4 illustrates a parent document incorporating an original fragment having a grammar dissimilar to the parent, according to one embodiment of the invention.

FIG. 4 illustrates a parent XML document incorporating an original fragment having a grammar dissimilar to the parent, according to one embodiment of the invention. As shown, a parent document 408 references an original fragment 402. In this case, however, unlike the document grammars shown in FIG. 3, the grammar used by parent document 408 is very dissimilar to the grammar used by original fragment 402. Specifically, the content in fragment 402 is nested inside four different markup tags, where the grammar for a <section> element in parent document 408 does not support nesting of elements to this depth. Thus, in this scenario, the structure of original fragment 402 is very dissimilar from the structure of parent document 408.

In one embodiment, CMS 130 may be configured to allow original fragment 402 to be used by parent document 408 by invoking a transformation action 406 on original fragment 402. The particular transformation action 406 may be specified in an XML configuration set 404 related to a document type associated with original fragment 402. Illustratively, original fragment 402 is bound to configuration set 404 by relationship 410. Using this relationship, CMS 130 may determine whether configuration set 404 contains any transformation actions that produce output valid within the context of parent document 408. As illustrated, parent document 408 includes original fragment 402 as a <section> element. However, original fragment 402 contains no <section> element and contains several sub-elements in its grammar, whereas the <section> element of parent document 408 only contains the sub-element <data>.

CMS 130 may determine that configuration set 404 contains a transformation action, "para-to-section.xsl", that produces output valid within the context of parent document 408. Therefore, a link is added to parent document 408 that references the appropriate transformation action 406 for the original fragment 402 which dynamically builds the <section> element whenever the parent document 408 is accessed. As a result, parent document 408 is able to freely include the content of original fragment 402 despite the differences in grammar between the two.

Fragment Insertion Process for Similar Document Grammars

Figure 5:
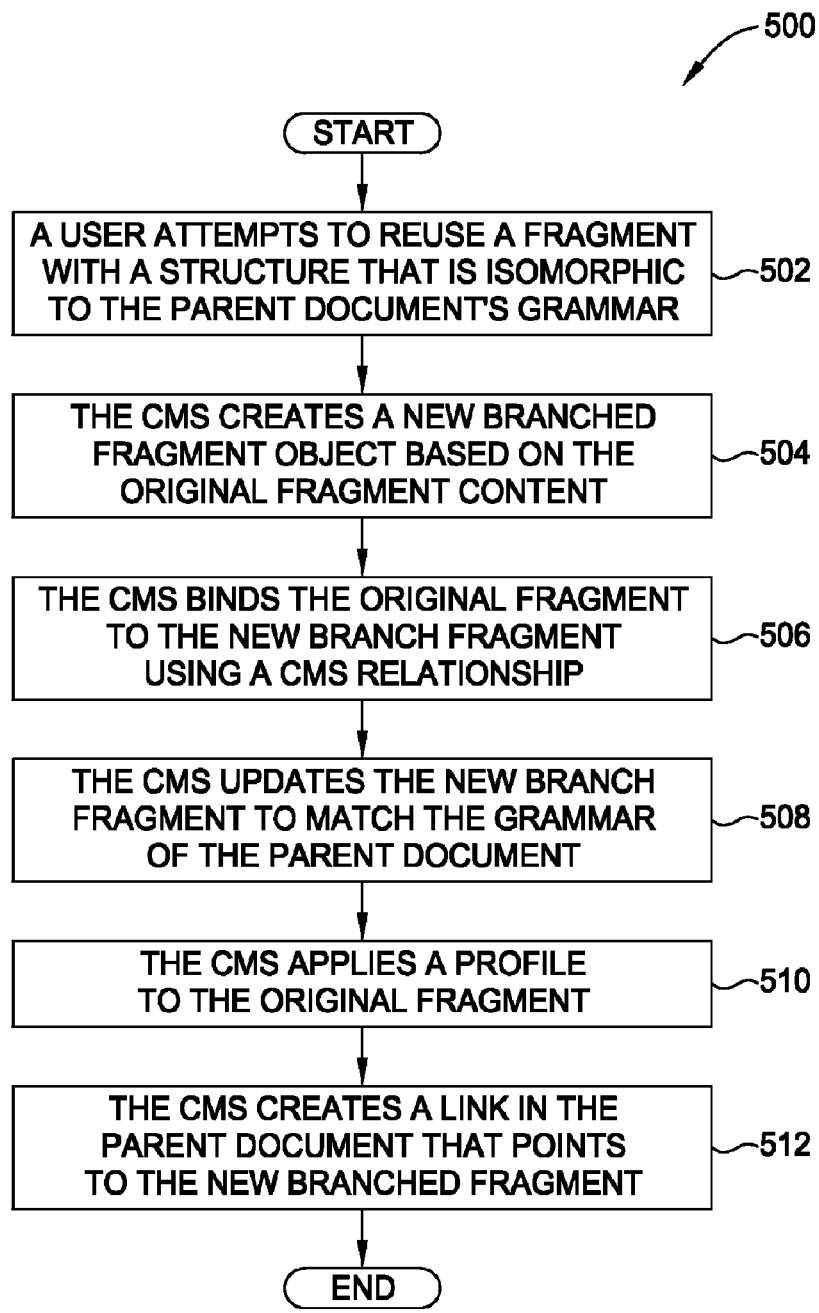
FIG. 5 is a flow diagram illustrating a process for inserting a branched fragment into a parent document, according to one embodiment of the invention.

FIG. 5 is a flow diagram illustrating a process 500 for inserting a branched fragment into a parent document, according to one embodiment of the invention. As shown, process 500 begins at step 502 when a user attempts to reuse an original fragment with a structure that is isomorphic to the structure of the parent document, but composed from different markup tags. The parent document may be any type of XML document included among managed content 212 in repository 124. At step 504, the CMS 130 creates a new branched fragment object based on the content of the original fragment. The branched fragment provides a copy of the original fragment to be modified and reused within the parent document.

At step 506, the CMS 130 binds the original fragment to the newly created branched fragment with a CMS relationship that is stored in repository relations 204. This allows the relationship between the original fragment and the branched fragment to be maintained. At step 508, the CMS 130 may modify the new branched fragment to correspond to the grammar of the parent document in which the branch fragment is being reused. For example, the CMS 130 may generate an XSLT transform to map between the grammar of the original fragment and the grammar of the branched fragment. As a result, a new reusable fragment is created for that parent document containing the content of the originally requested fragment, but in a grammar that is valid within the parent document.

At step 510, the CMS 130 may add a fragment profile 210 to elements (i.e. the markup tags) of the original fragment. In one embodiment, the fragment profile 210 indicates that the content in the original fragment is also copied in one or more branched fragments. As a result, CMS 130 may be able to update the branched fragment when content changes in the original fragment or in the branched fragment. At step 512, CMS 130 inserts the newly branched fragment into the document. Subsequently, when the document is checked into the CMS 130, the branched fragment may be burst from the parent and replaced with a link to the branched fragment.

Content Update

Figure 6:
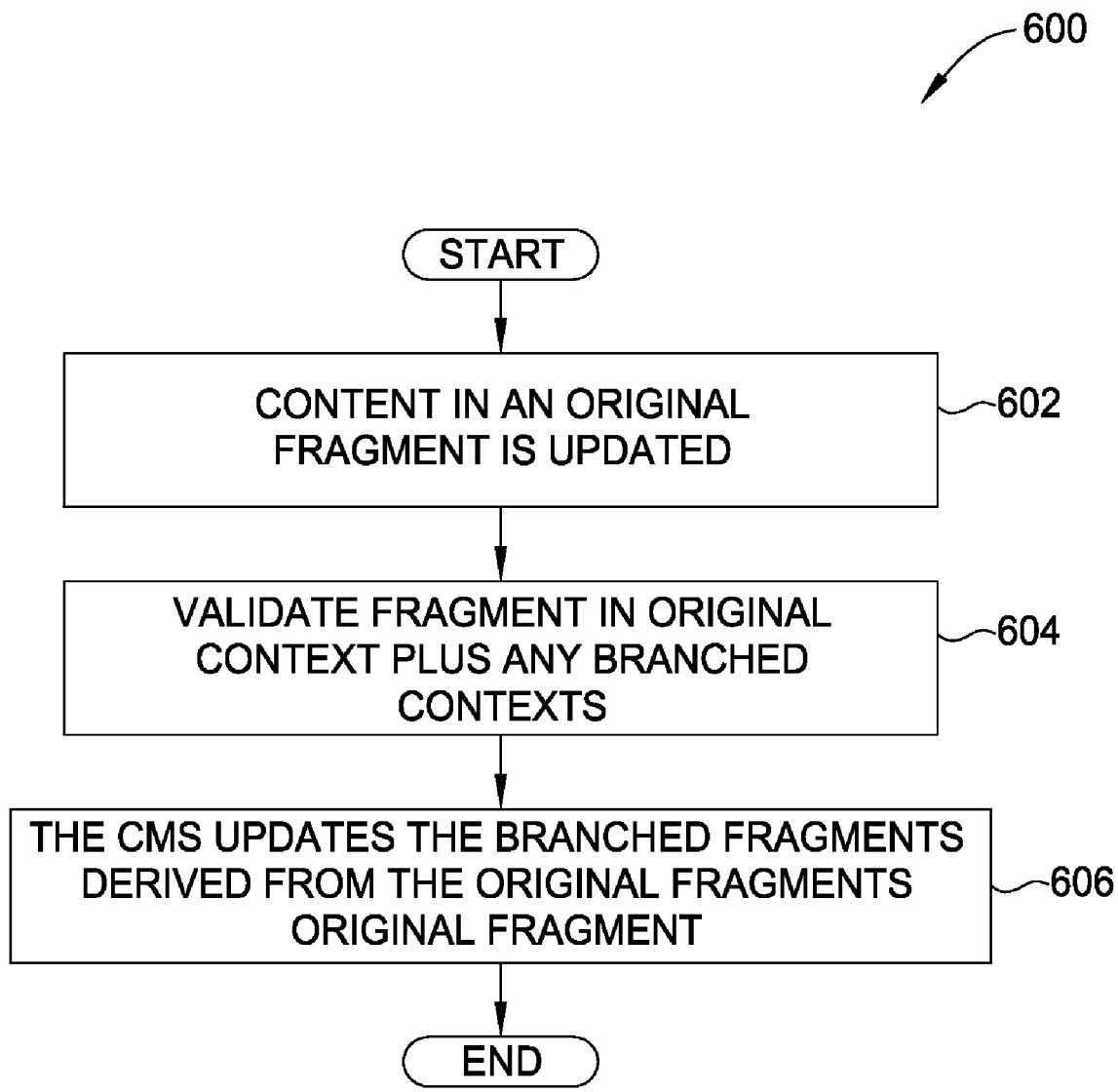
FIG. 6 is a flow diagram illustrating a process for updating the content in a branched fragment, based on changes to a corresponding original fragment, according to one embodiment of the invention.

FIG. 6 is a flow diagram illustrating a process 600 for updating the content in a branched fragment, based on changes to a corresponding original fragment, according to one embodiment of the invention. As shown, method 600 begins at step 602, when a client application 108 updates the content in an original fragment. For example, a user may check-out a parent document that includes the original fragment, modify the content of the document while checked-out, and subsequently check-in the document. Upon check-in, the fragments may be burst from the document, including bursting of the original fragment (with the now modified content).

At step 604, the original fragment is validated to determine whether any changes to the original fragment are invalid within any parent contexts in which the original fragment is incorporated (i.e., within the schema/DTD from which the original fragment was burst) or within any branched fragments derived from the original fragment (i.e., within the schema/DTDs associated with any branched fragments). In the event that the modifications "break" the original fragment within either the parent contexts or in any branched contexts, the CMS may reject the modified content, or may notify an administrator or documents' author or maintainer of the issue. Typically, while checked-out, the client application 108 may prevent a user from modifying the content of the original fragment in a manner inconsistent with a schema/DTD applicable to document which includes the original fragment. However, the original fragment may be modified in a manner that is valid within the parent context, but not valid within the context of one or more branched fragments associated with the original fragment. In such a case, CMS 130 may break the relationship between the original fragment and the branched fragment. Provided that the modifications are valid within the context of a given branched fragment, at step 606, CMS 130 updates the branched fragments based on the modifications to the content of the original fragment.

Although process 600 is described in terms of updating branched fragments based on an update to an original fragment, one of ordinary skill in the art will readily discern that process 600 could easily be adapted to update an original fragment based on changes made to a branched fragment.

Very Dissimilar Fragment Insertion Process

Figure 7:
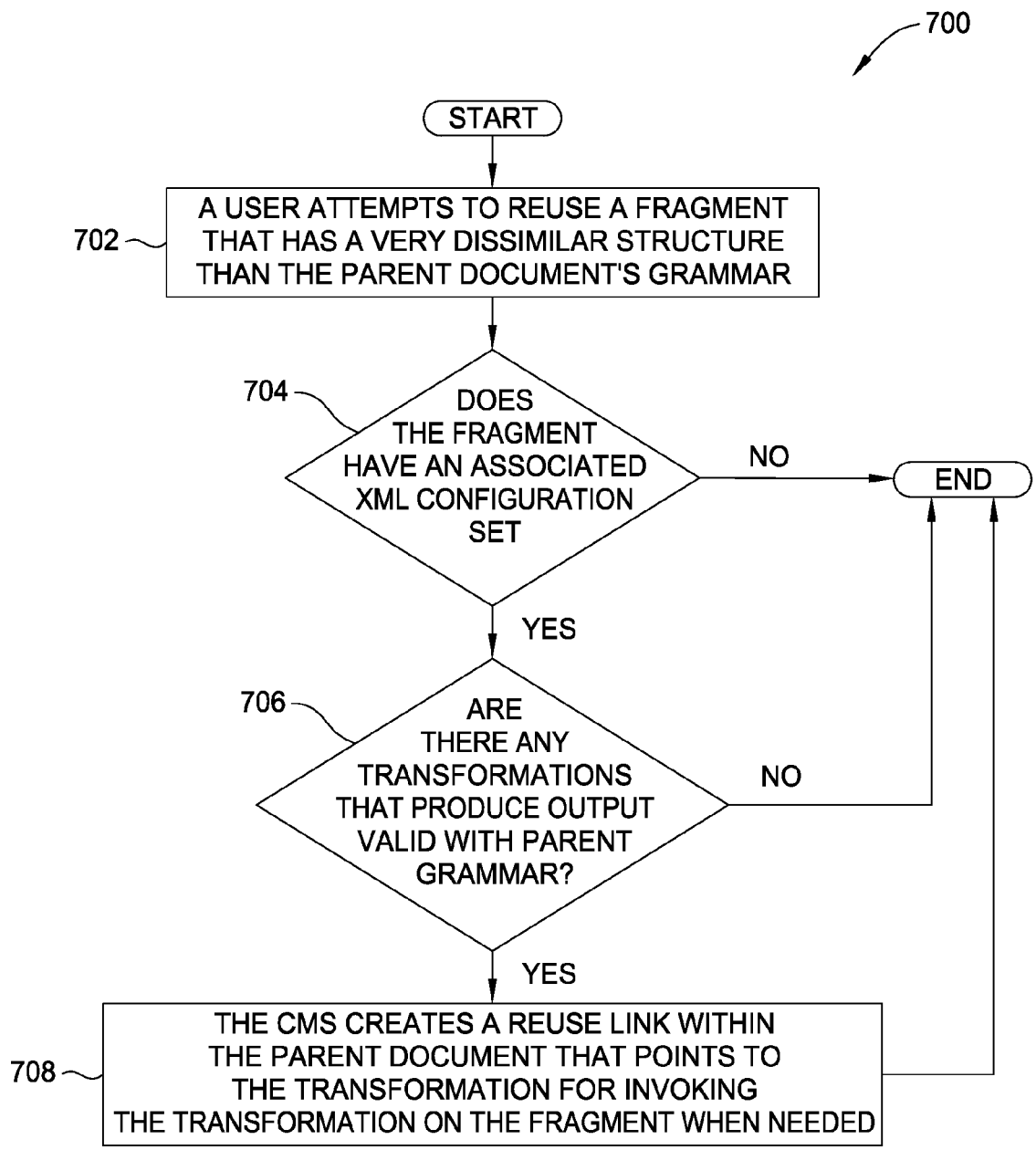
FIG. 7 is a flow diagram illustrating a process for inserting a branched fragment into a parent document, according to one embodiment of the invention.

FIG. 7 is a flow diagram illustrating a process 700 for inserting a branched fragment into a parent document, according to one embodiment of the invention. As shown, process 700 begins at step 702 when a user attempts to insert an original fragment into a parent document having a very dissimilar grammar.

At step 704, CMS 130 determines whether the original fragment, requested by the user, has an associated XML configuration set 216 (or other similar XML application/configuration or binding). As stated above, a configuration set may include a collection of information used to manage a particular document type, (e.g., style sheets, XSLT transforms, rules, etc). If there is no configuration set associated with the requested original fragment, then process 700 terminates and the user is notified that the original fragment may not be reused with in the parent document. In such a case, the user may still copy the substantive content from the original fragment for reuse in the parent document. Further, the user may also contact an administrator/supervisor if he feels the reuse of the element is necessary or worthwhile. The administrator may then supply an adequate transformation for the original fragment to make reuse possible.

If however, CMS 130 determines that the requested original fragment does have an associated configuration set, then CMS 130 proceeds to step 706 where it determines whether the configuration set contains any transformations that may be applied to the original fragment to produce output valid with the grammar of the parent document in which the user desires to include the original fragment. That is, the CMS 130 determines whether the fragment which a user desires to incorporate may be transformed in a manner such that it may be included and validated within the parent document. If not, process 700 terminates and the user is notified that the original fragment may not be reused with in the parent document. In such a case, the user may still copy the substantive content from the original fragment for reuse in the parent document.

Otherwise, if CMS 130 determines that a transformation of the configuration set produces output valid within the grammar of the parent document, then at step 708, CMS 130 may generate a reuse link within the parent document. As described, the reuse link may point to the transformation for invoking the transformation on the original fragment when needed. This transformation action is then performed whenever the parent document is reconstituted (i.e. whenever the parent document is checked-out from CMS, the fragment is transformed and inserted into the parent document).

Additionally, in one embodiment, CMS 130 may be configured to handle a special case in which it determines that a transformation of the configuration set produces output that is isomorphic to the parent document, and, if so, performing the transformation and processing the isomorphic output according to the previous process illustrated in FIG. 5. In other words, the transformation process may modify the original fragment in a manner that creates a document with a grammar similar to the parent document, but using different markup tags. In such case, process 500 may be used to create a branched fragment for the transformed version of the original fragment generated at step 708. If content in the original fragment is updated, the transformation action identified, via the reuse link within the parent document, ensures that the latest changes to the original fragment are incorporated into the parent document.

Advantageously, this provides users with a method for reusing content that is much less limited and much more tolerant and adaptable than current approaches. Therefore, a document author has a highly increased pool of content from which he/she may draw XML fragments from to incorporate within a parent document, since the grammar of the fragments is a much less limiting factor. In addition, all the advantages that come with the features of XML, such as "single source publishing", are maintained since the relationships between branch fragments and their originals ensure that any updates to an original fragment are mapped to all associated branch fragments. Therefore, users are able to incorporate content into a document without being as constrained by content grammar rules or synchronization issues between a branch fragment and its original fragment.

While the foregoing is directed to embodiments of the present invention, other and further embodiments of the invention may be devised without departing from the basic scope thereof, and the scope thereof is determined by the claims that follow.

What is claimed is:

1. A method for reusing content in multiple documents managed by a content management system (CMS), comprising:
   receiving a selection of a first document fragment composed according to a first document structure, wherein the first document fragment is to be included in a parent document composed according to a second document structure, wherein the first document structure comprises a first XML schema and the second document structure comprises a second XML schema, and wherein the first XML schema includes a set of markup tags different from a set of markup tags included in the second XML schema;
   generating, by operation of the one or more computer processors, a branched fragment that includes content from the first document fragment, wherein the branched fragment is composed according to the second document structure and wherein generating the branched fragment comprises:
   determining that the first document structure and the second document structure are structurally identical, and
   generating a mapping between one or more structural elements of the first document structure and corresponding elements of the second document structure, wherein the mapping between one or more structural elements of the first document structure and corresponding elements of the second document structure comprises mapping each markup tag of the first XML schema included in the first document fragment to a corresponding markup tag of the second XML schema;
   inserting the branched fragment in the parent document;
   generating a data structure indicating a relationship between the first document fragment and the branched fragment; and
   storing the data structure in the CMS.

2. The method of claim 1, further comprising:
   receiving a document that includes the first document fragment to check-in to the CMS;
   splitting the received document into a plurality of document fragments, wherein the first document fragment is one of the plurality of document fragments; and
   upon determining that the content from the first document fragment has been modified, updating the branched fragment to incorporate the modified content.

3. The method of claim 1, wherein generating the branched fragment further comprises:
   identifying a document transformation applicable to the first document structure, wherein the output of the document transformation is a document composed according to the second document structure;
   applying the transformation to the first document fragment to generate a transformed document fragment; and
   generating the branched fragment from the transformed document fragment.

4. The method of claim 3, wherein the document transformation comprises an XSLT transformation configured to generate an output XML document from an input XML document.

5. The method of claim 1, further comprising,
receiving a document that includes the first document fragment to check-in to the CMS;
splitting the received document into a plurality of document fragments, wherein the first document fragment is one of the plurality of document fragments; and
upon determining that the content from the first document fragment has been modified:
determining if the modifications to the first document fragment cannot be incorporate into the branched fragment, and in response, severing the relationship between the first document fragment and the branched fragment.

6. A computer-readable storage medium containing a program which, when executed, performs an operation for reusing content in multiple documents managed by a content management system (CMS), the operation comprising:
receiving a selection of a first document fragment composed according to a first document structure, wherein the first document fragment is to be included in a parent document composed according to a second document structure, wherein the first document structure comprises a first XML schema and the second document structure comprises a second XML schema, and wherein the first XML schema includes a set of markup tags different from a set of markup tags included in the second XML schema;
generating a branched fragment that includes content from the first document fragment, wherein the branched fragment is composed according to the second document structure and wherein generating the branched fragment comprises:
determining that the first document structure and the second document structure are structurally identical, and
generating a mapping between one or more structural elements of the first document structure and corresponding elements of the second document structure, wherein the mapping between one or more structural elements of the first document structure and corresponding elements of the second document structure comprises mapping each markup tag of the first XML schema included in the first document fragment to a corresponding markup tag of the second XML schema;
inserting the branched fragment in the parent document;
generating a data structure indicating a relationship between the first document fragment and the branched fragment; and
storing the data structure in the CMS.

7. The computer-readable storage medium of claim 6, wherein the operation further comprises:
receiving a document that includes the first document fragment to check-in to the CMS;
splitting the received document into a plurality of document fragments, wherein the first document fragment is one of the plurality of document fragments; and
upon determining that the content from the first document fragment has been modified, updating the branched fragment to incorporate the modified content.

8. The computer-readable storage medium of claim 6, wherein generating the branched fragment further comprises:
identifying a document transformation applicable to the first document structure, wherein the output of the document transformation is a document composed according to the second document structure;
applying the transformation to the first document fragment to generate a transformed document fragment; and
generating the branched fragment from the transformed document fragment.

9. The computer-readable storage medium of claim 8, wherein the document transformation comprises an XSLT transformation configured to generate an output XML document from an input XML document.

10. The computer-readable storage medium of claim 6, wherein the operation further comprises,
receiving a document that includes the first document fragment to check-in to the CMS;
splitting the received document into a plurality of document fragments, wherein the first document fragment is one of the plurality of document fragments; and
upon determining that the content from the first document fragment has been modified:
determining if the modifications to the first document fragment cannot be incorporate into the branched fragment, and in response, severing the relationship between the first document fragment and the branched fragment.

11. A system, comprising:
a processor; and
a memory containing a content management system (CMS) program configured to perform a method for reusing content in multiple documents managed by the CMS by performing the steps of:
receiving a selection of a first document fragment composed according to a first document structure, wherein the first document fragment is to be included in a parent document composed according to a second document structure, wherein the first document structure comprises a first XML schema and the second document structure comprises a second XML schema and wherein the first XML schema includes a set of markup tags different from a set of markup tags included in the second XML schema,
generating a branched fragment that includes content from the first document fragment, wherein the branched fragment is composed according to the second document structure, wherein generating the branched fragment comprises:
determining that the first document structure and the second document structure are structurally identical to one another; and
generating a mapping between one or more structural elements of the first document structure and corresponding elements of the second document structure, wherein the mapping between one or more structural elements of the first document structure and corresponding elements of the second document structure comprises mapping each markup tag of the first XML schema included in the first document fragment to a corresponding markup tag of the second XML schema,
inserting the branched fragment in the parent document,
generating a data structure indicating a relationship between the first document fragment and the branched fragment, and
storing the data structure in the CMS.

12. The system of claim 11, wherein the steps further comprise:

receiving a document that includes the first document fragment to check-in to the CMS;

splitting the received document into a plurality of document fragments, wherein the first document fragment is one of the plurality of document fragments; and upon determining that the content from the first document fragment has been modified, updating the branched fragment to incorporate the modified content.

13. The system of claim 11, wherein generating the branched fragment further comprises:

identifying a document transformation applicable to the first document structure, wherein the output of the document transformation is a document composed according to the second document structure;

applying the transformation to the first document fragment to generate a transformed document fragment; and generating the branched fragment from the transformed document fragment.

14. The system of claim 13, wherein the document transformation comprises an XSLT transformation configured to generate an output XML document from an input XML document.

15. The system of claim 11, wherein the steps further comprise:

receiving a document that includes the first document fragment to check-in to the CMS;

splitting the received document into a plurality of document fragments, wherein the first document fragment is one of the plurality of document fragments; and upon determining that the content from the first document fragment has been modified:

determining if the modifications to the first document fragment cannot be incorporate into the branched fragment, and in response, severing the relationship between the first document fragment and the branched fragment.

* * * * *